United States Patent
Langenberg et al.

(10) Patent No.: US 9,829,228 B2
(45) Date of Patent: Nov. 28, 2017

(54) METHOD FOR CONTROLLING A REFRIGERATOR, A CONTROL UNIT AND A REFRIGERATOR

(75) Inventors: Gero C. Langenberg, Flensburg (DE); Hans Erik Fogh, Broager (DK)

(73) Assignee: Danfoss A/S, Nordborg (DK)

( * ) Notice: Subject to any disclaimer, the term of this patent is extended or adjusted under 35 U.S.C. 154(b) by 849 days.

(21) Appl. No.: 14/232,303

(22) PCT Filed: Jul. 13, 2012

(86) PCT No.: PCT/DK2012/000084
§ 371 (c)(1),
(2), (4) Date: Jan. 13, 2014

(87) PCT Pub. No.: WO2013/010540
PCT Pub. Date: Jan. 24, 2013

(65) Prior Publication Data
US 2014/0174109 A1    Jun. 26, 2014

(30) Foreign Application Priority Data
Jul. 15, 2011    (DK) .................................. 2011 00545

(51) Int. Cl.
*F25B 49/00* (2006.01)
*F25D 29/00* (2006.01)

(52) U.S. Cl.
CPC .............. *F25B 49/00* (2013.01); *F25D 29/00* (2013.01); *F25D 2700/02* (2013.01)

(58) Field of Classification Search
CPC ...... F25B 49/00; F25B 2600/01; F25D 29/00; F25D 2700/02; F25D 2700/04; F25D 2600/01

USPC ........................................... 62/131, 157, 231
See application file for complete search history.

(56) References Cited

U.S. PATENT DOCUMENTS

| 4,528,821 A | 7/1985 | Tershak et al. |
| 4,852,360 A | 8/1989 | Harshbarger, Jr. et al. |
| 5,512,883 A | 4/1996 | Lane, Jr. |
| 5,765,382 A | 6/1998 | Manning et al. |

(Continued)

FOREIGN PATENT DOCUMENTS

| CN | 100545777 C | 9/2009 |
| EP | 0 090 431 A2 | 3/1983 |

(Continued)

OTHER PUBLICATIONS

Danish Search Report Serial No. PA201100545 dated Feb. 3, 2012.

(Continued)

*Primary Examiner* — Kun Kai Ma
(74) *Attorney, Agent, or Firm* — McCormick, Paulding & Huber LLP

(57) ABSTRACT

The invention relates to a method for controlling a refrigerator. The method comprises the steps of establishing a time interval of a certain duration, a first use of the refrigerator starting a first time interval, starting a subsequent time interval based on the start of the first time interval, and subtracted a time difference. The subsequent time interval subtracted a time difference is being used for starting a cool-down period of the subsequent time interval. The invention also relates to a control unit for the refrigerator and to a refrigerator with such control unit.

15 Claims, 1 Drawing Sheet

(56) References Cited

U.S. PATENT DOCUMENTS

| | | | |
|---|---|---|---|
| 5,806,321 A * | 9/1998 | Bendtsen | F25D 21/008 62/155 |
| 5,842,355 A | 12/1998 | Kalis et al. | |
| 7,822,503 B2 * | 10/2010 | Merwarth | F25D 29/00 700/232 |
| 2002/0083724 A1 * | 7/2002 | Tarlow | A23L 3/3409 62/131 |
| 2002/0088238 A1 | 7/2002 | Holmes et al. | |
| 2002/0139130 A1 | 10/2002 | Collins et al. | |
| 2002/0139132 A1 * | 10/2002 | Collins | F25D 21/006 62/156 |
| 2003/0140639 A1 | 7/2003 | Gray et al. | |
| 2004/0000154 A1 * | 1/2004 | Schanin | F25D 29/00 62/157 |
| 2004/0050075 A1 * | 3/2004 | King | F25D 29/00 62/131 |
| 2005/0177282 A1 * | 8/2005 | Mason, II | G07F 9/105 700/300 |
| 2007/0125103 A1 | 6/2007 | Lee | |
| 2007/0295015 A1 * | 12/2007 | Bailey | F25D 21/006 62/150 |
| 2009/0051486 A1 * | 2/2009 | Denison | G07F 11/002 340/5.25 |
| 2013/0174872 A1 | 7/2013 | Holbrook, Jr. et al. | |
| 2014/0123690 A1 * | 5/2014 | Hanley | F25D 21/006 62/80 |

FOREIGN PATENT DOCUMENTS

| | | |
|---|---|---|
| EP | 1 909 050 A1 | 4/2008 |
| WO | 01/90668 A1 | 11/2001 |

OTHER PUBLICATIONS

Danish Search Report Serial No. PA201100548 dated Feb. 9, 2012.
International Search Report for Application Serial No. PCT/DK2012/000084 dated Sep. 12, 2013.

* cited by examiner

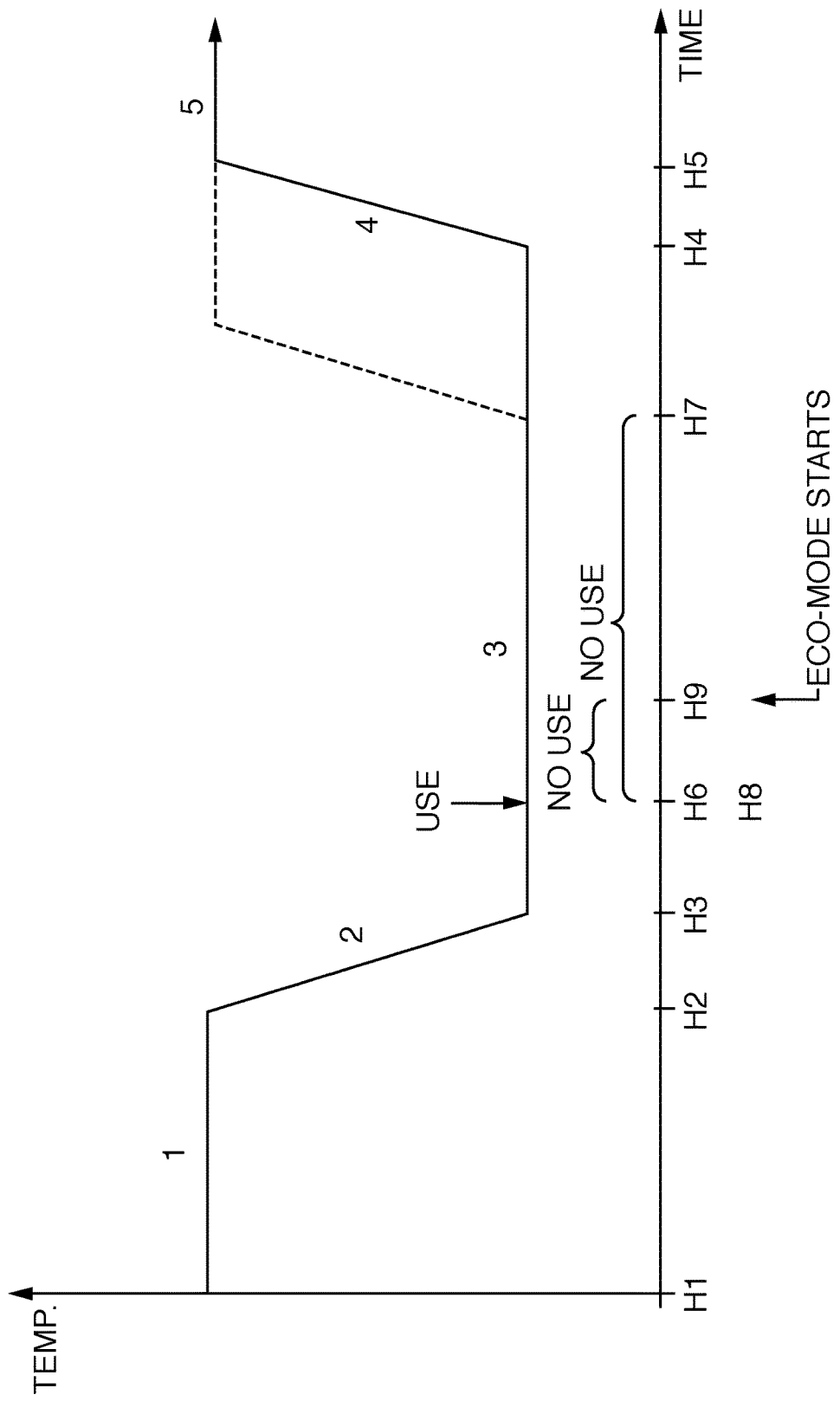

METHOD FOR CONTROLLING A REFRIGERATOR, A CONTROL UNIT AND A REFRIGERATOR

CROSS REFERENCE TO RELATED APPLICATIONS

This application is entitled to the benefit of and incorporates by reference subject matter disclosed in International Patent Application No. PCT/DK2012/000084 filed on Jul. 13, 2012 and Danish Patent Application No. PA 2011 00545 filed Jul. 15, 2011.

FIELD OF THE INVENTION

The invention relates to a method for controlling a refrigerator and to a refrigerator. Refrigerators for food and/or beverages may be controlled so that cooling to a certain lower temperature compared to a relatively higher temperature primarily takes place during opening hours. This is possible for food and/or beverages which do not suffer from being stored at the higher temperature, but which is best for consumption when being cooled such as food like pasta and vacuum-packed food and such as beverages like water, soft drinks, beer and other kind of beverages. Such food and/or beverages need not being kept at constant low temperature in order to be preserved until sale and/or consumption of the food and/or beverages.

BACKGROUND

It is known to have a mechanical or electronic control of coolers, especially coolers for beverages, said control adjusting the temperature during a certain period of time, e.g. during a week, so that the temperature of the coolers are adjusted to a lower temperature during opening hours of a store, and so that the temperature is adjusted to a higher temperature during closing hours of the store. Thereby saving electrical energy for the compressor used in the cooler is obtained. A timer schedule is set up taking into account actual opening hours and closing hours of the store, said schedule being followed during a prolonged period of time, such as half a year when the timer schedule possibly needs to be adjusted due to day-time saving, or other irregularities during a calendar year in the country where the cooler is situated, or due to differentiated opening and closing hours of the store.

A problem may be that there are periods during the day, where the store is open, but where the sale of food and/or beverages nevertheless is absent. Food and/or beverages being cooled to a lower temperature, resulting in a higher electrical energy consumption, although the food and/or beverages may be stored at a higher temperature, during absent sale, which would result in a lower electrical energy consumption, thus a consumption of electrical energy during opening hours which is not needed due to the absent sale.

It may be an object of the invention to reduce the electrical energy consumption of refrigerators, not only during closing hours, but also during opening hours. It may alternatively be an object of the invention to reduce the electrical energy consumption of domestic refrigerators during hours of the day, where food and/or beverages are not inserted into or retracted from the refrigerator for consumption.

SUMMARY

The above object is obtained by a method for controlling a refrigerator, said method comprising the steps of establishing a time interval of a certain duration (e.g. 24 hours), a plurality of time intervals (e.g. weeks, months, years) being a total period of time for controlling the refrigerator, monitoring, before any time interval is set, a first use of the refrigerator, said first use starting a first time interval (e.g. Monday), starting a subsequent time interval (e.g. Tuesday or Wednesday etc.) based on the start of the first time interval, and subtracted a time difference (e.g. 1 hour) of a certain duration.

The method according to the invention results in a mode of operation which need not be scheduled and entered in a timer control, and in a mode of operation which is more related to real-time usage of the refrigerator depending on circumstances such as buyer behaviour of customers, different closing hours during different days, weeks and months of the year, and depending on other factors which alters the usage of the refrigerator compared to a scheduled mode of operation.

A preferred method comprises the further steps of if, within a first time interval, a first use of the refrigerator is detected, establishing the actual time of day when said first use is detected, and when the first time interval expires, basing the actual time of day of the first use within the first time interval as start of the refrigerator within a subsequent second time interval, said second time interval being subsequent to the first time interval.

Basing start of the refrigerator within a subsequent second time interval on a first use within a preceding first time interval, it is an immediate previous use, i.e., the first use during the first time interval the day before, that determines start the day after, presuming the day today is similar to the day before. Such mode of operation is beneficial during week-days and other days where the store is open and where the days of opening follow immediately after each other.

According to an aspect of the invention, the method comprises the step of if, within a first time interval, a first use of the refrigerator is not detected, determining an actual time of day of a first use within a previous time interval, said previous time interval being previous to said first time interval, and when the first time interval expires, basing the actual time of day of the first use within the previous time interval as start of the refrigerator within a subsequent second time interval, said second time interval being subsequent to the first time interval.

Basing start of the refrigerator within a subsequent second time interval on a first use within a previous time interval, and not basing start of the refrigerator within a subsequent second time interval on a first use within a preceding first time interval, it is not an immediate previous use, but a use perhaps two days before, that determines start the day after, presuming the day today is similar to two days before. Such mode of operation is beneficial during week-ends and other days where the store is closed and where the days of opening do not follow immediately after each other, such as when the store is closed, e.g., Sunday.

The duration of at least one of the time intervals, preferably the duration of each of the time intervals, may be 24 hours. A duration of 24 hours is convenient, as it makes it possible to have an update of the method according to the invention every day, not only every week, thus being able to take into account different buyer behaviour during different weeks, and during different days of the week.

The duration of the time difference is between half an hour and 6 hours, possibly between half and hour and 3 hours. The duration of the time difference is dependent on how long time the refrigerator must use for decreasing the temperature from a higher temperature to a lower temperature. The time needed differs, depending on the refrigerator as such, on the number of and the heat capacity of items stored in the refrigerator and on the temperature difference between the higher temperature and the lower temperature.

The duration of a the intermediate time interval is between 1 hour and 12 hours, possibly between 3 hours and 9 hours. The duration of the intermediate time interval is dependent on the expected buyer behaviour of the customers and on the need and object of saving electrical power for the refrigerator.

An aspect of the invention is the method furthermore comprising the following steps:
  establishing an intermediate time interval, the duration of said intermediate time interval being less than the duration of the first or the subsequent time interval,
  monitoring, within each intermediate time interval, a possibly use of the refrigerator,
  establishing whether a use of the refrigerator, within the intermediate time interval, is detected or not,
  if a use of the refrigerator, within the intermediate time interval, is detected, maintaining the refrigerator in a lower temperature operation mode, and
  if a use of the refrigerator, within the intermediate time interval, is not detected, switching the refrigerator to a higher temperature operation mode.

The above specific aspect of the invention, i.e., introducing an intermediate interval, provides the possibility of switching the refrigerator to a higher temperature operation mode at an earlier time of day than provided according to the general aspect of the invention. By switching to a higher temperature operation mode at an earlier time of day, energy consumption of the refrigerator is reduced even more than achieved according to the general aspect of the invention.

BRIEF DESCRIPTION OF THE DRAWINGS

The FIGURE is a chart of a possible relation between time of day and temperature of a refrigerator according to the invention.

DETAILED DESCRIPTION

The invention will hereafter be described with reference to the accompanying drawing showing a chart of a possible relation between time of day and temperature of a refrigerator according to the invention of, e.g., a store. In the remainder of the detailed description, a store will be used as an example of utilising the invention. However, cooling of warehouses, domestic cooling appliances or other sites where cooling is needed may also be sites for utilizing the invention.

The chart shows periods of higher temperature intervals 1 and 5, an interval of lower temperature 3, an interval 2 where the temperature decreases from a higher temperature to a lower temperature, and an interval 4 where the temperature increases from a lower temperature to a higher temperature. The different intervals are shown with straight lines. Straight lines are only for illustrative purposes, the lines may have a different extension, straight or non-straight. Basically, it is the time of day and the temperature of endpoints of the intervals that is of interest, and it is the discontinuities of whole the line from start to end, extending along the different intervals that is of interest.

A first interval 1 illustrates a period of where the store is closed. Within the first interval, the temperature is set to a certain higher temperature T1. The first interval 1 starts at a time of day denoted H1. At a certain time H2 of the day, a control module controls the refrigerator and the refrigerator starts increasing cooling, whereby the temperature enters a second interval 2. During the second interval 2, the temperature decreases from the higher temperature T1 until a certain low temperature T2 is reached. The lower temperature T2 is maintained for e certain period of time during a third interval 3, e.g., 12 hours.

After the certain period of time of the third interval 3 and at a certain time of day H4, the control module controls the refrigerator and the refrigerator allows the temperature to increase within a fourth interval 4. The control takes it for granted, that the store is closed or that access for customers to the refrigerator is otherwise prevented, and therefore the temperature is allowed to increase during the fourth interval 4.

During the fourth interval 4, the temperature increases from the lower temperature T2 to a higher temperature T1. During a fifth interval 5, the temperature is maintained at the higher temperature T1, until a certain period of time have elapsed, so that the cycle shown in the chart stars all over again, i.e., end of the fifth interval 5 is immediately followed by start of the first interval 1. As example, start of the first interval 1 may be immediately after midnight and end of the fifth interval 5 may be immediately before midnight.

The actual time of day H2 when the second interval 2 starts is determined by a monitoring and a determination of a first use of the refrigerator. A first use may a first opening of a door or hatch to the refrigerator, indicating a customer taking food or beverages from the refrigerator. A first use during a first day is the basis for when the second interval is started a second day following the first day. The second interval of the second day will start at the same time as the first use detected the first day, but subtracted a time difference, e.g., one hour.

That is because the control is calculating the first use the second day to be at the same actual time of day as the first use the first day, and in order for the food and/or beverages to cool down before the first use the second day, a time difference is subtracted the actual time of day of the calculated first use the second day.

If a first use a first day is taking place, e.g., at 8 o'clock in the morning, start of the second interval the next day may be, e.g., at 7 o'clock in the morning, so that the food and/or beverages in the refrigerator are allowed time for cooling to the lower temperature before a first expected use the second day. Accordingly, in the example given, the second interval will be a certain period of time of approximately 1 hour or less. The first interval, if starting immediately after midnight will then be approximately 7 hours, i.e., from midnight until 7 o'clock in the morning, when the second interval starts.

The third interval is the interval intended for the opening hours of the store. In the example given, the third interval starts at 8 o'clock in the morning and the duration is the entire opening hours of the store, e.g., until 8 o'clock in the evening. And accordingly, the fourth interval starts at 8 o'clock in the evening and the duration may be, e.g., 1 hour until 9 o'clock in the evening. The duration of the fifth interval will then be approximately 3 hours, from 9 o'clock in the evening until midnight. Thereafter, the cycle shown in the chart will start all over.

If, during the third interval, i.e., during the opening hours of the store, and within an intermediate period of time between time H6 and time H7, no use of the refrigerator has been detected during said intermediate period of time, the refrigerator will shift to the fourth interval, but possibly before the scheduled start of the fourth interval. This is illustrated by the dotted line, i.e., the start of the fourth interval 4 not being at time H4, but being at time H7, said time H7 being calculated based upon no use since time H6. The intermediate period of time where no use of the refrigerator has been detected, i.e. the interval between H6 and H7, may be, e.g., 6 hours. The control will then expect the store to be closed such as on Sundays or during holidays. The start of the second interval the day after such a closing day will then be calculated based on the first use the day preceding the Sunday or the holidays, said day preceding the Sunday or the holidays being a day where the store was open.

Situation as above may occur if the store is closed all day following a day when the store were open, or if the store is only open for a shorter period of time than the day before, said shorter period of time only starting, e.g., 6 hours later than the actual time of opening the day before, e.g., late opening in weekends or holidays.

If, during the third interval, and within a limited period of time between a time H8 and a time H9 of, e.g. 2 hours, no use of the refrigerator has been detected, the refrigerator may shift to a different kind of operation than normal operation, in the flowing called eco-mode. The limited period of time between time H8 and time H9 is shorter than the intermediate period of time between time H6 and time H7.

The time H8 may be the same as time H6, but it may also be different if other parameters are used for starting the period of time between time H8 and time H9, than parameter stating the period of time between time H6 and time H7.

Eco-mode of operation may result in different changes of operation of the refrigerator compared to normal operation of the refrigerator. Eco-mode of operation is not the same as increasing the temperature from the lower temperature to the higher temperature, i.e., eco-mode of operation is not the operating mode used during the fourth, fifth and first interval.

Eco-mode of operation is a mode of operation, where similar and/or other modes of operation are started for decreasing the electrical consumption of the refrigerator during the third interval. A non-exhaustive list of Eco-mode of operation may be: low sale period detected because of use of the refrigerator being non-frequent, e.g., use detected only every quarter of an hour or more; excess cooling capacity available from other cooling appliances connected to the refrigerator; exterior light conditions detected as being satisfactory for lighting of the refrigerator being switched off.

The period of time within the second interval, which will start the eco-mode of operation may be, e.g., 2 hours. If no use of the refrigerator is detected for 2 hours within the third interval, the mode of operation of the refrigerator will switch to eco-mode of operation. Thus, as mentioned, the period of time for starting eco-mode of operation is shorter than the period of time for starting the fourth interval.

If, within the second interval, a new use of the refrigerator is detected, the period of time starting with H6 will be recalculated based on the time of day of the new use. It may be that also the period of time starting at time H8 may be recalculated, but not necessarily, there may be other parameters such as how often a use of the refrigerator is detected, which may be monitored when controlling start and controlling possible recalculation of the period of time starting at time H8.

Although various embodiments of the present invention have been described and shown, the invention is not restricted thereto, but may also be embodied in other ways within the scope of the subject-matter defined in the following claims.

What is claimed is:

1. A method for controlling a refrigerator temperature, said method comprising the steps of:
    establishing a total period of time for controlling the refrigerator comprising a series of time intervals of a certain duration;
    monitoring a first use of the refrigerator, said first use starting a first time interval in the series of said time intervals;
    starting the refrigerator for a subsequent second time interval in the series of said time intervals at a start time calulated as the time of the first use, plus the time interval of the certain duration, minus a specified period of time, in order for the refrigerator to establish a specified temperature at a certain time of day within the subsequent time interval;
    establishing an intermediate period of time in a low temperature operation mode during a selected one of the time intervals;
    detecting an intermediate use of the refrigerator during the intermediate period of time;
    if the intermediate use of the refrigerator is detected within the intermediate period of time, maintaining the refrigerator in the low temperature operation mode during the selected one of the time intervals when the intermediate period of time interval expires; and
    if the intermediate use of the refrigerator is not detected within the intermediate period of time, switching the refrigerator to a high temperature operation mode during the selected one of the time intervals when the intermediate period of time expires.

2. The method according to claim 1, wherein the duration of the time intervals is 24 hours.

3. The method according to claim 1, wherein the duration of the specified period of time is between half an hour and 6 hours.

4. The method according to claim 1, wherein the duration of the intermediate period of time is between 1 hour and 12 hours.

5. The method according to claim 1, wherein for the calculation of the start time for starting the refrigerator for the subsequent second time interval, the time interval is 24 hours and the specified period of time is the time for the refrigerator to lower the refrigerator temperature to the specified temperature from a higher temperature.

6. The method according to claim 5, wherein the specified temperature is between 0 degrees Celsius and 10 degrees Celsius.

7. The method according to claim 5, wherein the higher temperature is between 10 degrees Celsius and 20 degrees Celsius.

8. The method according to claim 1, said method comprising the further steps of:
    detecting use of the refrigerator during a limited period of time;
    if use of the refrigerator is not detected within the limited period of time, determining an actual time of day of a last use of the refrigerator, and when the limited period of time expires, controlling the refrigerator to a so-called eco-mode of operation, where one or more energy consuming entities of the refrigerator are switched off or are switched to a reduced energy consumption.

9. The method according to claim 8, wherein at least one of the following parameters are monitored and detected for controlling the refrigerator according to the so-called eco-mode: sale period being detected as a low sale period because of use of the refrigerator being non-frequent; excess cooling capacity available from other cooling appliances connected to the refrigerator; exterior light conditions detected as being satisfactory for lighting of the refrigerator being switched off.

10. A method for controlling a refrigerator temperature, said method comprising the steps of:
   establishing total period of time for controlling the refrigerator comprising a series of time intervals of a certain duration; and
   monitoring use of the refrigerator;
   if use of the refrigerator is detected within a first time interval in the series of time intervals, establishing a time of the detected use and starting the refrigerator at the time of the detected use within a subsequent second time interval in the series of time intervals;
   if use of the refrigerator is not detected within a first time interval in the series of time intervals, determining a time of prior use of the refrigerator in a previous time interval before said first time interval, and starting the refrigerator at the time of prior use within a subsequent second time interval in the series of time intervals;
   detecting use of the refrigerator during a limited period of time;
   if use of the refrigerator is not detected within the limited period of time, determining an actual time of day of a last use of the refrigerator, and
   when the limited period of time expires, controlling the refrigerator to a so-called eco-mode of operation, where one or more energy consuming entities of the refrigerator are switched off or are switched to a reduced energy consumption.

11. The method according to claim 1, wherein the first use of the refrigerator is an opening of a door or a hatch either for inserting to the refrigerator foodstuff or beverages for later extraction, or for extracting from the refrigerator foodstuff or beverages for further distribution, for purchase or for consumption.

12. A control unit for a refrigerator, said control unit being configured to:
   establish a total period of time for controlling the refrigerator comprising a series of time intervals of a certain duration;
   monitor a first use of the refrigerator, said first use starting a first time interval in the series of the plurality of said time interval;
   start the refrigerator for a subsequent second time interval in the series of the plurality of said time interval at a start time calulated as the time of the first use, plus the time interval of the certain duration, minus a specified period of time, in order for the refrigerator to establish a specified temperature at a certain time of day within the subsequent time interval;
   establish an intermediate period of time in a low temperature operation mode during a selected one of the time intervals;
   detect an intermediate use of the refrigerator during the intermediate period of time;
   wherein if the intermediate use of the refrigerator is detected within the intermediate period of time, the control unit maintains the refrigerator in the low temperature operation mode during the selected one of the time intervals when the intermediate period of time interval expires; and
   wherein if the intermediate use of the refrigerator is not detected within the intermediate period of time, the control unit switches the refrigerator to a high temperature operation mode during the selected one of the time intervals when the intermediate period of time expires.

13. A refrigerator comprising a control unit configured to:
   establish a total period of time for controlling the refrigerator comprising a series of time intervals of a certain duration;
   monitor a first use of the refrigerator, said first use starting a first time interval in the series of the plurality of said time interval;
   start the refrigerator for a subsequent second time interval in the series of the plurality of said time interval at a start time calulated as the time of the first use, plus the time interval of the certain duration, minus a specified period of time, in order for the refrigerator to establish a specified temperature at a certain time of day within the subsequent time interval;
   establish an intermediate period of time in a low temperature operation mode during a selected one of the time intervals;
   detect an intermediate use of the refrigerator during the intermediate period of time;
   wherein if the intermediate use of the refrigerator is detected within the intermediate period of time, the control unit maintains the refrigerator in the low temperature operation mode during the selected one of the time intervals when the intermediate period of time interval expires; and
   wherein if the intermediate use of the refrigerator is not detected within the intermediate period of time, the control unit switches the refrigerator to a high temperature operation mode during the selected one of the time intervals when the intermediate period of time expires.

14. The method according to claim 9, wherein the parameter being monitored and detected for controlling the refrigerator according to the so-called eco-mode is whether exterior light conditions detected as being satisfactory for lighting of the refrigerator being switched off.

15. The method according claim 10, wherein the duration of the time interval is 24 hours.

* * * * *